United States Patent
Satish

(10) Patent No.: US 9,230,115 B1
(45) Date of Patent: *Jan. 5, 2016

(54) EDUCATING COMPUTER USERS CONCERNING SECURITY THREATS

(71) Applicant: Symantec Corporation, Mountain View, CA (US)

(72) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/549,861

(22) Filed: Nov. 21, 2014

Related U.S. Application Data

(63) Continuation of application No. 12/771,980, filed on Apr. 30, 2010, now Pat. No. 8,955,109.

(51) Int. Cl.
| | |
|---|---|
| *G06F 11/00* | (2006.01) |
| *G06F 21/57* | (2013.01) |
| *G06F 21/50* | (2013.01) |
| *G09B 19/00* | (2006.01) |

(52) U.S. Cl.
CPC .............. *G06F 21/577* (2013.01); *G06F 21/50* (2013.01); *G09B 19/0053* (2013.01); *G06F 2221/034* (2013.01)

(58) Field of Classification Search
CPC ..................... H04L 63/1433; H04L 29/06904; G06F 21/57; G06F 21/577
See application file for complete search history.

(56) References Cited

U.S. PATENT DOCUMENTS

| | | | | |
|---|---|---|---|---|
| 6,298,445 | B1 * | 10/2001 | Shostack et al. ................. | 726/25 |
| 2004/0064726 | A1 * | 4/2004 | Girouard ........................ | 713/201 |
| 2004/0193918 | A1 * | 9/2004 | Green et al. ................... | 713/201 |
| 2005/0193430 | A1 * | 9/2005 | Cohen et al. .................... | 726/25 |
| 2006/0191010 | A1 * | 8/2006 | Benjamin ........................ | 726/23 |
| 2008/0115221 | A1 * | 5/2008 | Yun et al. ......................... | 726/25 |
| 2010/0138925 | A1 * | 6/2010 | Barai et al. ...................... | 726/25 |

* cited by examiner

*Primary Examiner* — Esther B Henderson
(74) *Attorney, Agent, or Firm* — Brill Law Office; Jeffrey Brill

(57) ABSTRACT

Attacks are simulated to a user, by performing the steps of the attacks without actually performing any malicious activity. Educational security information is displayed to the user, based on the user's response to simulated attacks. If the user responds to a simulated attack in a manner indicating that the user is vulnerable, educational security information can be displayed that educates the user as to how to avoid being victimized. One or more security settings for protecting the user's computer from malware can be adjusted, based on the user's response to the simulating of attacks. Additionally, other factors can be adjusted based on the user's response to the simulating of attacks, such as a security hygiene rating and/or a level of monitoring activity concerning the user.

19 Claims, 4 Drawing Sheets

EDUCATING COMPUTER USERS CONCERNING SECURITY THREATS

PRIORITY CLAIM

This patent application is a Continuation of patent application Ser. No. 12/771,980, filed on Apr. 30, 2010, titled "Educating Computer Users Concerning Social Engineering Security Threats" (the "Parent Application").

TECHNICAL FIELD

This disclosure pertains generally to computer security, and more specifically to educating computer users concerning security threats.

BACKGROUND

Often, the weakest link in a computer security system is the user. Whereas anti-malware systems and operating system level security are constantly being improved to detect and block new computer security threats, even computers running the best security platforms can still be compromised by user mistakes. With this in mind, malware authors frequently target the user, and attempt to trick the user into actively installing malware or otherwise unwittingly taking a proactive step that would compromise the security of the computer.

One common attack today is the fake anti-virus scan. In this attack, an alert box or similar user interface component pops up on the user's screen, indicates that the computer is susceptible to infection by computer viruses and/or other types of malware, and offers to scan the computer for malware. Unless the user closes the user interface component, it typically pretends to scan the computer, and then claims to have identified various malware infections. The user is then invited to download free anti-malware software that is supposed to be able to fix the detected infestations. If the user selects to download the "anti-malware" software, the attack instead takes advantage of the user having initiated a download of an unknown program to infect the user's computer by installing malware. There are many variations on this attack, some involving offers of fake data anti-corruption tools, fake codecs for playing videos, etc.

Although security software is always being updated to detect and block new attacks, no matter how good security software becomes, the user always remains a potential weak spot in the overall security of the computer system. Not only naive users but even advanced users can be susceptible, primarily due to the ever evolving sophistication of new social networking attacks. It would be desirable to address these issues.

SUMMARY

A user security education system educates and protects a user of a computer by simulating specific attacks. A specific attack is simulated to the user, for example by simulating the activities of the specific attack without actually performing any malicious activity. Educational security information is displayed to the user, based on the user's response to the simulated attack. For example, if the user responds to the simulated attack in a manner indicating that the user is vulnerable, educational security information can be displayed that educates the user as to how to avoid being victimized. More generally, educational security information can be displayed that educates the user as to the workings of attacks, and specific steps to take to in order to avoid being victimized by them. One or more security settings for protecting the user's computer from malware can be adjusted, based on the user's response to the simulating of attacks. Additionally, other factors can be adjusted based on the user's response to the simulating of attacks, such as a security hygiene rating and/or a level of monitoring activity concerning the user. Attack description updates concerning new attacks can be installed as they become available, and the new attacks can be simulated to further educate and protect the user.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
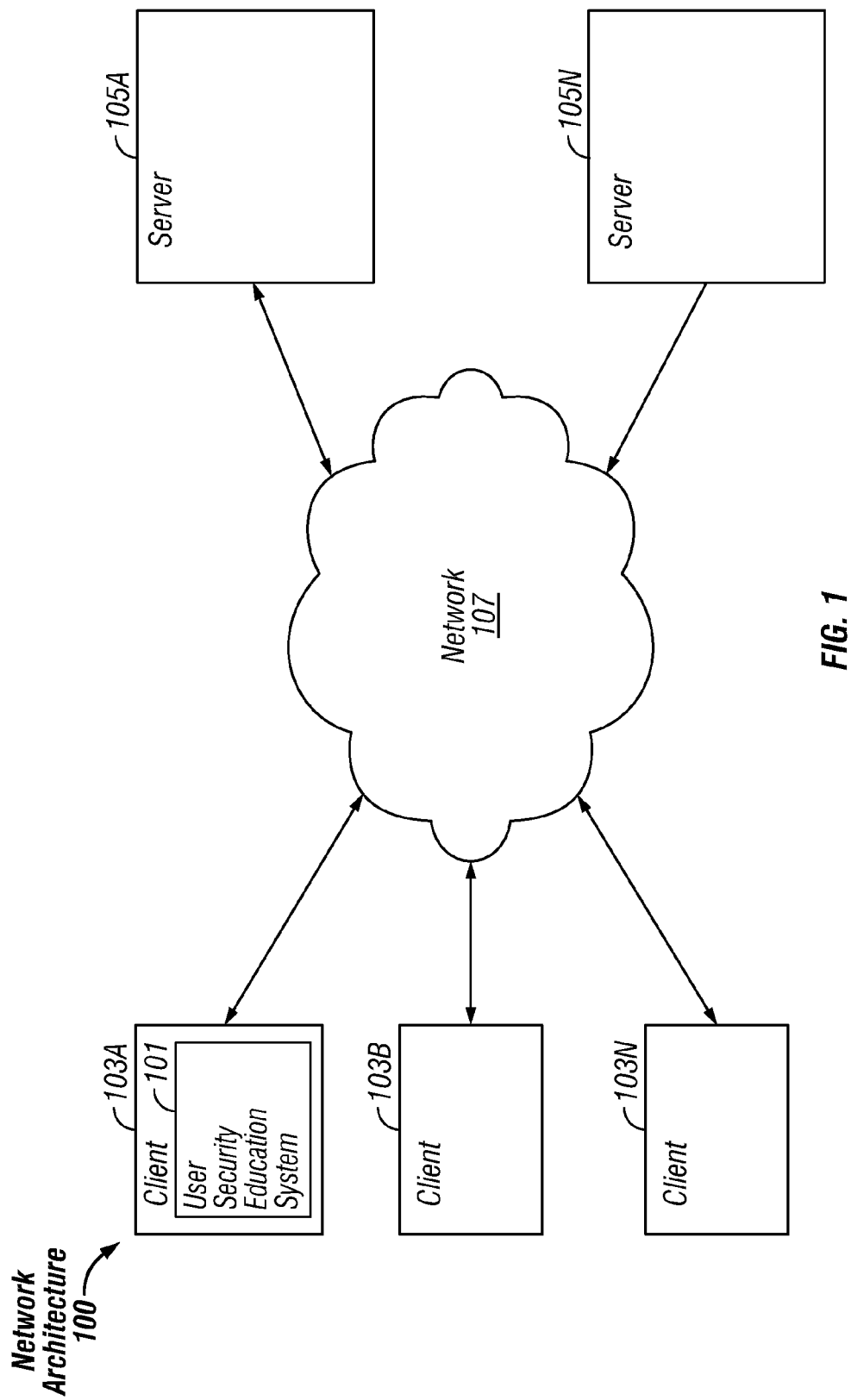
FIG. 1 is a block diagram of an exemplary network architecture in which a user security education system can be implemented, according to some embodiments.

FIG. 1 is a block diagram illustrating an exemplary network architecture 100 in which a user security education system 101 can be implemented. The illustrated network architecture 100 comprises multiple clients 103A, 103B and 103N, as well as multiple servers 105A and 105N. In FIG. 1, the user security education system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
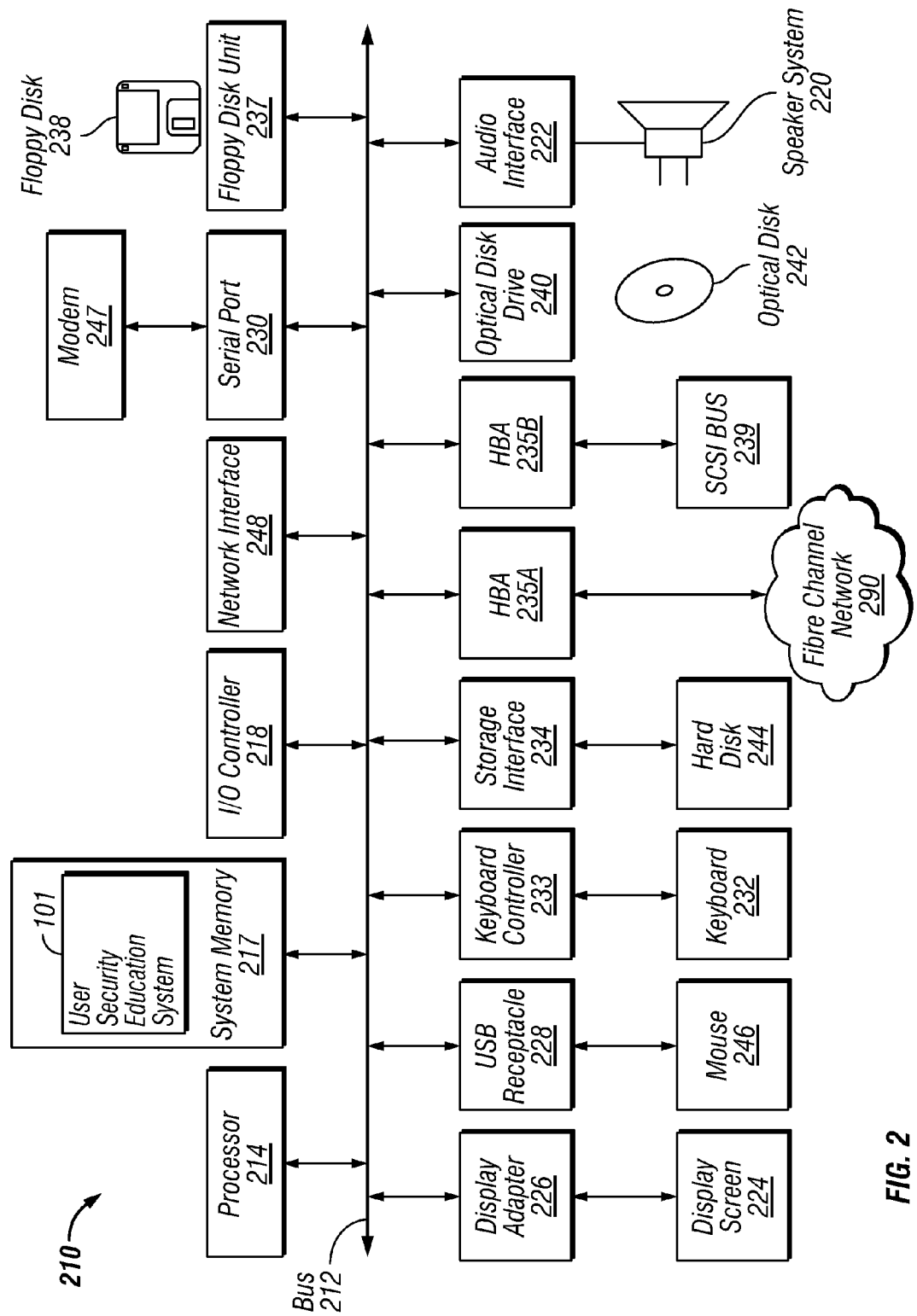
FIG. 2 is a block diagram of a computer system suitable for implementing a user security education system, according to some embodiments.

FIG. 2 is a block diagram of a computer system 210 suitable for implementing a user security education system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the user security education system 101 is illustrated as residing in system memory 217. The workings of the user security education system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
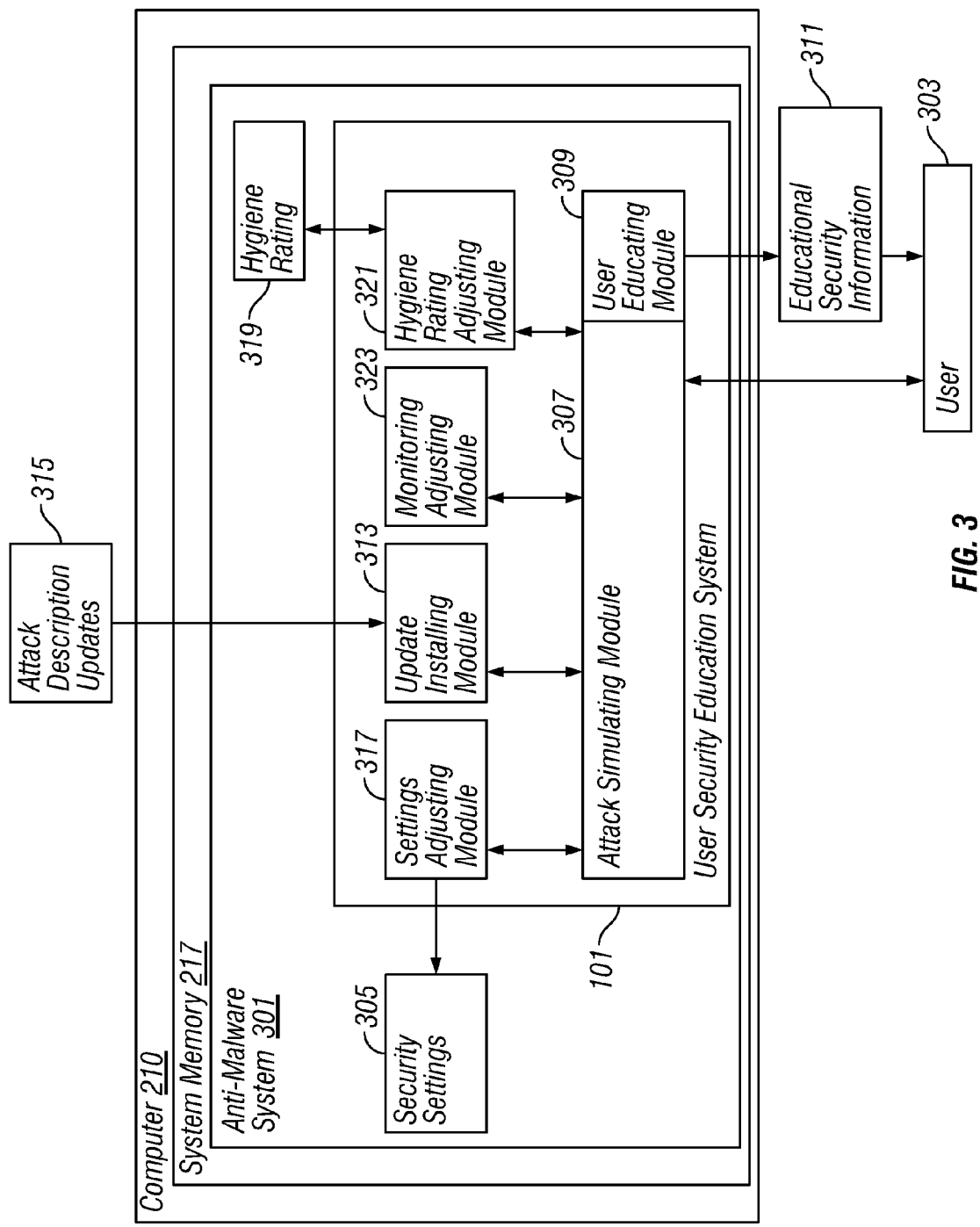
FIG. 3 is a block diagram of the operation of a user security education system, according to some embodiments.

FIG. 3 illustrates the operation of a user security education system 101 residing in the system memory 217 of a client computer 103 as a component of an anti-malware system 301, according to some embodiments. In other embodiments, the user security education system 101 is not instantiated as a component of the anti-malware system 301. As described above, the functionalities of the user security education system 101 can reside on a client 103, a server 105, or be distributed between multiple computer systems 210, including within a cloud-based computing environment in which the functionality of the user security education system 101 is provided as a service over a network 107. It is to be understood that although the user security education system 101 is illustrated in FIG. 3 as a single entity, the illustrated user security education system 101 represents a collection of functionalities, which can be instantiated as a single or multiple modules as desired (an instantiation of specific, multiple modules of the user security education system 101 is illustrated in FIG. 3). It is to be understood that the modules of the user security education system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the user security education system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the user security education system 101 simulates attacks so as to educate the user 303 concerning best practices to avoid being victimized. The security education system 101 also adjusts the security settings 305 used by the anti-malware system 301 on the user's computer 210 based on how the user 303 responds to the simulated attacks.

An attack simulating module 307 of the user security education system 101 simulates the activities performed during specific (e.g., current) attacks, without actually performing any malicious activity. As described in more detail below, such attack simulations can be performed either shortly after the installation of the anti-malware system 301 and/or at later points in time. The attack simulating module 307 could, for example, display a popup notification (or other user interface display component) stating that the user's computer 210 has security vulnerabilities, without any indication of what security product is issuing the warning. As described above, this is a form of a common attack. The attack simulating module 307 would then note that it is scanning the user's computer 210 for malware, indicate that it has detected a high rate of infection, and suggest that the user 303 click on a provided link to download and install anti-malware software. In the event of a real social networking attack, if the user 303 clicked the link, the attack would infect the user's computer 210 with malware. However, in this context, a user educating module 309 of the user security education system 101 displays educational security information 311 to the user 303, in response to how the user 303 reacts to the simulated attack.

By displaying educational security information 311, the user educating module 309 helps to educate the user 303 as to how attacks are performed, how it is possible to be victimized, and what specifically to do and not do in order to avoid being victimized by such attacks. Returning to the above example of the offer to download fake anti-malware software, if the user 303 clicks on the link to download the offered software, the user educating module 309 could display educational security information 311 indicating that although this has been a simulation and that the user's computer 210 is secure, the steps that were simulated are those often performed by a real social networking attack, and that if the simulated attack had been real, the user's computer 210 would have become infected because the user elected to install unknown software. The educational security information 311 could further explain how similar attacks work (e.g., offers to download and install fake data de-corruption tools and/or fake codec components). The educational security information 311 can also outline specific steps to take (and/or not to take) in the future to avoid being victimized by the described attack (e.g., instead of clicking on the link to download the software being offered, cancel the unknown program, e.g., by clicking in the upper right hand corner). As used herein, the term "educational security information" 311 means information describing known attacks output to the user 303 in response to the user's reaction to a simulated attack. Educational security information 311 can include, for example, descriptions of how the attack(s) work, and how to avoid them.

Continuing with the example of the offer to download fake anti-malware software, if the user 303 does not attempt to download the software but instead cancels or otherwise dismisses the program, the user educating module 309 could display educational security information 311 indicating that although this has been a simulation, the user 303 made a wise choice by dismissing a program performing the actions of a common attack. The user 303 could also be informed of similar ongoing attacks (e.g., offers of fake data de-corruption tool and codec downloads), and be advised to keep up the good work and be sure not to fall victim to those attacks either.

It is to be understood that the above-description of the simulated fake anti-malware attack is simply an example. The attack simulating module 307 can simulate other attacks as desired. In some embodiments, an update installing module 313 of the of the user security education system 101 checks for attack description updates 315 concerning new (e.g., newly discovered) attacks. The update installing module 313 can check for new attack description updates 315 on, for example, a centrally located distribution server (not illustrated). When new attack description updates 315 are found, the update installing module 313 downloads and installs them, so that the attack simulating module 307 can simulate and thus protect against the corresponding new attacks. It is to be understood that as used herein the term "attack description update" 315 means information concerning a new attack specific enough to enable the simulation of and education regarding the attack as described above. For example, attack description updates 315 could comprise scripts for simulating new attacks as they become known, and corresponding educational security information 311 to educate users 303. In some embodiments, the attack simulating module 307 simulates a new attack shortly after a corresponding attack description update 315 becomes available.

A settings adjusting module 317 can adjust the security settings 305 of the anti-malware system 301, in response to the user's responses to simulated attacks. Anti-malware systems 301 are conventionally faced with a trade-off between the robustness of the security they provide and their impact on the performance of the protected computer 210. Typically, the more steps the anti-malware system 301 performs to keep the computer 210 secure from attacks, the more of an impact these steps will have on the general performance of the computer 210. Additionally, tighter security tends to result in a higher rate of false positives. With this in mind, some conventional anti-malware systems 301 allow the user 303 to adjust at least some security settings 305 up and down to manage the above-described trade-off. It is to be understood that as used herein the term "security setting" 305 means a configured value indicating to an anti-malware system 301 a variable degree to which to exercise one or more given security function(s) and/or procedure(s). For example, many conventional heuristics based security engines (which provide probable cause and effect and/or approximation based decisions in the context of anti-malware analysis) can be set to have variable levels of detection. In this context, higher settings 305 typically result in a higher level of malware detection, but at the cost of more false positives and/or performance degradation.

By his or her responses to simulated attacks, the user 303 provides information to the user security education system 101 that the settings adjusting module 317 can use to automatically adjust the security settings 305 of the anti-malware system 301. Typically, prior to a first simulated attack, the security settings 305 are set to default levels. Based on the user's responses to one or more simulated attacks, the settings adjusting module 317 can adjust individual security settings up or down. If the user 303 has shown that s/he is prepared to avoid a certain type of attack, the level of one or more security settings 305 corresponding to that attack can be lowered. On the other hand, where a user 303 is found to be susceptible to such an attack, the settings adjusting module 317 can raise associated security settings 305. In some embodiments, rather than adjusting security settings 305 automatically, the settings adjusting module 317 recommends (e.g., via a user interface, not illustrated) adjustments to make to the user 303, who can then make the adjustments or not as desired. In some embodiments, the user 303 always has the option to adjust security settings 305 and/or set them to default values manually, e.g., via user interface operation, such that the user 301 can override any automatic adjustments made by the settings adjusting module 317. In some embodiments, the security settings 305 are initially set to high defaults, but the user 303 is subject to a simulated attack as soon as practicable (in some cases shortly after installation). The user's response can then result in a lowering of security settings 305 as described above. As the user 303 reacts to multiple simulated attacks over time, security settings 305 can be lowered (or raised) based on how the user 303 performs, and whether the user 303 is found to be capable of managing security threats.

The information gleaned from the user's responses to simulated attacks can be used for other purposes as well. For example, in some anti-malware systems 301, a security hygiene rating 319 is tracked and used to make security decisions. A conventional security hygiene rating 319 is informed by factors such as the user's security event history (e.g., whether the user has been subject to attempted malware attacks, whether the attacks were successful, how often, does the user have a history of browsing high risk sites, etc.). In some embodiments, the user's responses to simulated attacks are used by a hygiene rating adjusting module 321 to adjust the user's hygiene rating 319. Where the user 303 reacts properly to a simulated attack, the hygiene rating can be improved and vice versa. The adjusted hygiene rating 319 can be used by the anti-malware system 101 to make security decisions in the manner in which a conventional security hygiene rating 319 would be so used.

As another example, in some embodiments a monitoring adjusting module 323 adjusts a level of monitoring (and/or logging) used by an otherwise conventional monitoring system (e.g., a parental control system, not illustrated). More specifically, based on how a child (or other monitored user 303 such as an employee) reacts to simulated attacks, the monitoring adjusting module 323 can adjust the monitoring level, thereby directing the monitoring system to monitor and/or log the child's computer activity more or less extensively. As with security settings 305, more extensive monitoring allows for greater control but tends to degrade performance. Therefore, it is desirable to be able to adjust monitoring activity based on the actions of the user 303.

Because some users 303 might prefer not to be subject to simulated attacks, in some embodiments the user 303 can disable attack simulation functionality (e.g., via a user interface) temporarily and/or permanently. In some embodiments, attacks are only simulated when it is determined that the user 303 is not performing a critical or important function (e.g., transacting with a financial institution, completing a form, etc.) so as to reduce any inconvenience and/or annoyance that might be caused. For example, in one embodiment attacks could be simulated when the user is reading an online magazine or playing an online game, but not when the user is engaging an ecommerce. In some embodiments, attacks are only simulated in the case where the user 303 has a low security hygiene rating 319 or is otherwise likely to be subject to attack (i.e., the user has a tendency to visit potentially harmful sites, the user has recently experienced an attack that was blocked by the anti-malware system 301, the anti-malware system 301 has detected that a given attack is currently widespread, etc.). In general, how often and when to simulate an attack is a variable design parameter.

Figure 4:
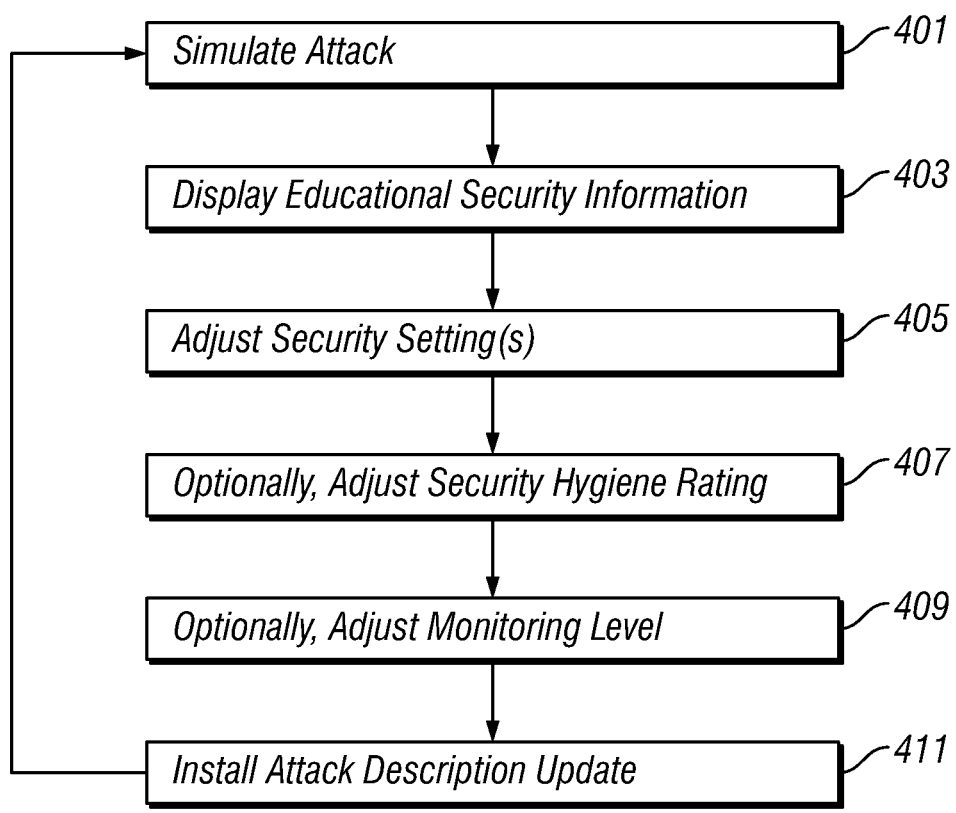
FIG. 4 is a flowchart of the operation of a user security education system, according to some embodiments.

FIG. 4 illustrates steps for the operation of a user security education system 101 (FIG. 1), according to some embodiments. The attack simulating module 307 (FIG. 3) simulates 401 a specific attack to the user 303 (FIG. 3). The user educating module 309 (FIG. 3) displays 403 educational security information 311 (FIG. 3) to the user 303, based on the user's response to the simulated attack. The settings adjusting module 317 (FIG. 3) adjusts 405 one or more security settings for protecting the user's computer 210 (FIG. 2) from malware, based on the user's response to the simulating of the attack. In addition, based on the user's response to the simulating of the attack, the hygiene rating adjusting module 321 (FIG. 3) can adjust 407 a security hygiene rating 319 (FIG. 3) concerning the user 303 (FIG. 3) and the monitoring adjusting module 323 (FIG. 3) can adjust 409 a level of monitoring activity. The update installing module 313 (FIG. 3) installs 411 attack description updates 315 (FIG. 3) concerning new attacks as they become available, and the new attacks can be simulated 401 to further educate and protect the user 303 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for educating and protecting users concerning attacks through attack simulation, the method comprising the steps of:

selecting a user to for attack simulation based on a security hygiene rating, wherein the security hygiene rating is based on a history of security events for the user;

simulating, by a computer, the specific attack against the user, wherein the attack targets a user action to perform the attack;

receiving a user action in response to the simulated specific attack;

displaying educational security information to the user concerning best practices for the user including steps to avoid being victimized, based on the user's response to the simulating of the specific attack, said educational security information describing the specific attack;

adjusting the security hygiene rating concerning the user, based on the user's response to the simulated specific attack; and automatically adjusting, based on the security hygiene rating of the user, at least one security setting for protecting a computer operated by the user from malware.

2. The method of claim 1 wherein simulating, by a computer, the specific attack further comprises:

simulating, by a computer, activities performed during the specific attack, without performing any malicious activity.

3. The method of claim 1 wherein displaying, by a computer, educational security information to the user, based on the user's response to the simulating of the specific attack, further comprises:

based on the user responding to the simulating of the specific attack in a manner indicating that the user is vulnerable to being victimized by the specific attack, displaying, by a computer, educational security information educating the user as to how to avoid being victimized by the specific attack.

4. The method of claim 1 wherein displaying, by a computer, educational security information to the user further comprises:

displaying, by a computer, educational security information educating the user as to the workings of attacks, and specific steps to take to in order to avoid being victimized by attacks.

5. The method of claim 1 further comprising:

installing, by a computer, an attack description update concerning a new attack;

simulating, by a computer, the new attack;

displaying, by a computer, educational security information to the user, based on the user's response to the simulating of the new attack, said educational security information describing the new attack; and adjusting, by a computer, at least one security setting for protecting the computer operated by the user from malware, based on the user's response to the simulating of the new attack.

6. The method of claim 1 further comprising:

adjusting, by a computer, a level of monitoring activity concerning the user, based on the user's response to the simulating of at least one attack.

7. At least one non-transitory computer readable storage medium storing a computer program product for educating and protecting users concerning attacks through attack simulation, the computer program product comprising program code to perform a method comprising the steps of:

selecting a user to for attack simulation based on a security hygiene rating, wherein the security hygiene rating is based on a history of security events for the user;

simulating the specific attack against the user, wherein the attack targets a user action to perform the attack;

receiving a user action in response to the simulated specific attack;

displaying educational security information to the user concerning best practices for the user including steps to avoid being victimized, based on the user's response to the simulating of the specific attack, said educational security information describing the specific attack;

adjusting the security hygiene rating concerning the user, based on the user's response to the simulated specific attack; and automatically adjusting, based on the security hygiene rating of the user, at least one security setting for protecting a computer operated by the user from malware.

8. The computer program product of claim 7 wherein the program code for simulating the specific attack further comprises:

program code for simulating activities performed during the specific attack, without performing any malicious activity.

9. The computer program product of claim 7 wherein the program code for displaying educational security information to the user, based on the user's response to the simulating of the specific attack, further comprises:

program code for, based on the user responding to the simulating of the specific attack in a manner indicating that the user is vulnerable to being victimized by the specific attack, displaying educational security information educating the user as to how to avoid being victimized by the specific attack.

10. The computer program product of claim 7 wherein the program code for displaying educational security information to the user further comprises:

program code for displaying educational security information educating the user as to the workings of attacks, and specific steps to take to in order to avoid being victimized by attacks.

11. The computer program product of claim 7 further comprising:

program code for installing an attack description update concerning a new attack;

program code for simulating the new attack;

program code for displaying educational security information to the user, based on the user's response to the simulating of the new attack, said educational security information describing the new attack; and program code for adjusting at least one security setting for protecting the computer operated by the user from malware, based on the user's response to the simulating of the new attack.

12. The computer program product of claim 7 further comprising:

program code for adjusting a level of monitoring activity concerning the user, based on the user's response to the simulating of at least one attack.

13. A computer system for educating and protecting a user concerning attacks through attack simulation, the computer system comprising:

at least one processor; and a computer memory comprises:

an attack simulator module to simulate a specific attack against the user, wherein the attack targets a user action to perform the attack, and to receive a user action in response to the simulated attack;

an user educator module to display educational security information to the user concerning best practices including steps to avoid being victimized, based on the user's response to the simulating of the specific attack, said educational security information describing the specific attack; and a settings adjustment module to adjust the security hygiene rating concerning the user, based on the user's response to the simulated specific attack, and to automatically adjust based on the user's response to the simulating of the specific attack, at least one security setting for protecting a computer operated by the user from malware.

14. The computer system of claim 13 wherein the attack simulator module simulating the specific attack further comprises:

the attack simulating module simulating activities performed during the specific attack, without performing any malicious activity.

15. The computer system of claim 13 wherein displaying educational security information to the user, based on the user's response to the simulating of the specific attack, further comprises:

the settings adjusting module adjusting, based on the user responding to the simulating of the specific attack in a manner indicating that the user is vulnerable to being victimized by the specific attack, displaying educational security information educating the user as to how to avoid being victimized by the specific attack.

16. The computer system of claim 13 wherein displaying educational security information to the user further comprises:

the user educating module displaying educational security information educating the user as to the workings of attacks, and specific steps to take to in order to avoid being victimized by attacks.

17. The computer system of claim 13 further comprising:

an update installing module, in the memory, to install an attack description update concerning a new attack, wherein the attack simulator module simulates the new attack, wherein the user education module displays educational security information to the user, based on the user's response to the simulating of the new attack, said educational security information describing the new attack, and wherein the settings adjustment module adjusts at least one security setting for protecting the computer operated by the user from malware, based on the user's response to the simulating of the new attack.

18. The computer system of claim 13 further comprising:

a monitoring adjustment module to adjust a level of monitoring activity concerning the user, based on the user's response to the simulating of at least one attack.

19. The method of claim 1, wherein the security hygiene rating is determined by one of: whether the user has been subject to attempted malware attacks, whether attacks on the user have been successful, and how often the user browses high risk web sites.

* * * * *